United States Patent
Kwak et al.

(10) Patent No.: US 10,747,697 B2
(45) Date of Patent: Aug. 18, 2020

(54) SEMICONDUCTOR DEVICE, METHOD OF OPERATING SEMICONDUCTOR DEVICE AND SYSTEM INCORPORATING SAME

(71) Applicant: SAMSUNG ELECTRONICS CO., LTD., Suwon-si, Gyeonggi-do (KR)

(72) Inventors: Young Ho Kwak, Suwon-si (KR); Kwang Hee Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/695,058

(22) Filed: Sep. 5, 2017

(65) Prior Publication Data
US 2018/0095920 A1 Apr. 5, 2018

(30) Foreign Application Priority Data
Oct. 5, 2016 (KR) .................. 10-2016-0128398

(51) Int. Cl.
G06F 13/38 (2006.01)
G06F 11/20 (2006.01)
G06F 13/12 (2006.01)
G06F 13/42 (2006.01)

(52) U.S. Cl.
CPC ........ *G06F 13/385* (2013.01); *G06F 11/2005* (2013.01); *G06F 13/124* (2013.01); *G06F 13/4286* (2013.01)

(58) Field of Classification Search
CPC .................................................. G06F 13/385
See application file for complete search history.

(56) References Cited

U.S. PATENT DOCUMENTS

| | | | | |
|---|---|---|---|---|
| 7,426,597 | B1 * | 9/2008 | Tsu ...................... | G06F 13/4018 710/307 |
| 7,631,136 | B2 * | 12/2009 | Mao ...................... | G06F 13/423 370/352 |
| 7,730,376 | B2 | 6/2010 | Das Sharma | |
| 7,756,123 | B1 * | 7/2010 | Huang ................ | G06F 13/4022 370/359 |
| 7,836,352 | B2 | 11/2010 | Sharma et al. | |
| 8,677,176 | B2 | 3/2014 | Buckland et al. | |
| 9,292,465 | B2 | 3/2016 | Trivedi et al. | |
| 9,325,449 | B2 | 4/2016 | Birrittella | |
| 2006/0114918 | A1 | 6/2006 | Ikeda et al. | |
| 2012/0144087 | A1 * | 6/2012 | Buckland ............ | G06F 13/4068 710/316 |
| 2016/0147606 | A1 | 5/2016 | Arroyo et al. | |

* cited by examiner

*Primary Examiner* — Henry Tsai
*Assistant Examiner* — Juanito Borromeo
(74) *Attorney, Agent, or Firm* — Volentine, Whitt & Francos, PLLC

(57) ABSTRACT

A PCIe capable semiconductor device includes; ports respectively configured to transmit and receive data in a PCIe environment, and a PCIe controller configured to set a link between the PCIe capable semiconductor device and another PCIe capable semiconductor device. The link includes at least one lane implemented over at least one of the ports. The PCIe controller includes a link training and status state machine (LTSSM) configured to perform a first lane number negotiation according to a first ordering of the ports and a second lane number negotiation according to a second ordering of the ports different from the first ordering of the ports, and determine an optimized link width for the link according to the results of the first lane number negotiation and the second lane number negotiation.

20 Claims, 15 Drawing Sheets

SEMICONDUCTOR DEVICE, METHOD OF OPERATING SEMICONDUCTOR DEVICE AND SYSTEM INCORPORATING SAME

This application claims priority from Korean Patent Application No. 10-2016-0128398 filed on Oct. 5, 2016, the subject matter of which is hereby incorporated by reference.

BACKGROUND

The inventive concept relates to semiconductor devices, semiconductor systems, and method of operating same.

The term Peripheral Component Interconnect (PCI) denotes an evolving body of technical specifications associated with the inter-communication of data between electronic devices. PCI express (PCIe) is an extension of PCI and provides interface protocols that are widely used in the computing industry to facilitate high-speed data transmission between semiconductor devices, or devices included within a semiconductor system. The PCIe interface protocol is well documented as one type of serial data transmission interface protocol. Accordingly, certain PCIe technical specifications, such as the "PCI Express Base Specification Revision 3.1a" published by an organization called PCI SIG may be readily obtained. (Reference e.g., https://pcisig-.com/). Hereafter, all pertinent documentation conventionally accessible to those skilled in the art, wholly or in part and including related forthcoming updates, will be termed "the PCIe technical specification."

As described in considerable detail in the PCIe technical specifications, PCIe technology provides a bidirectional connection that may be used to simultaneously transmit and receive data. In this context, the term "simultaneously" means that a period during which a PCIe capable device transmits data overlaps at least in part a period during which it receives data. The bidirectional connection may include a simplex transmitting path and a simplex receiving path. In order to emphasize such a structure, the bidirectional connection model defined by the PCIe interface protocol may also referred to as a dual-simplex connection model. With the foregoing in mind, a device may alternately be said to be "PCIe enabled", "PCIe capable", or capable of "operating in a PCIe environment" where features and performance specified by the PCIe technical specification are substantially incorporated.

The transmitting and receiving paths between PCIe capable devices are termed a "link", where a link includes at least one pair of transmitting and receiving paths. Here, the transmitting and receiving paths constituting one such "pair" may be termed a "lane". In this regard, a number of lanes included within a link is defined as a corresponding "link width".

In order for PCIe devices to transmit and receive data, an initialization routine for defining (or "setting") a link in a physical layer of the PCIe interface protocol must be executed. However, successful execution of the initialization routine is not guaranteed, and the setting of one or more lanes may fail. For example, a lane may not be set during the initialization routine if a data transmitting path cannot be established. In the event of a "failed lane", the PCIe device(s) should establish a link using one or more other lane(s).

SUMMARY

In one aspect the inventive concept provides a semiconductor device capable of maximizing link width between PCIe devices even if one or more failed lane exists as the result of setting a link between the PCIe devices.

In another aspect the inventive concept provides a semiconductor system similarly capable of maximizing link width between PCIe devices.

In still another aspect the inventive concept provides a method of operating a semiconductor device or semiconductor system capable of maximizing link width between PCIe devices even if one or more failed lane exists as the result of setting a link between the PCIe devices.

However, embodiments of the inventive concept are not limited to just these listed aspects, and other aspects of the inventive concept as set forth in the present disclosure will become more apparent to those of ordinary skill in the art.

According to one embodiment of the inventive concept, there is provided a PCIe capable semiconductor device including; ports respectively configured to transmit and receive data in a PCIe environment, and a PCIe controller configured to set a link between the PCIe capable semiconductor device and another PCIe capable semiconductor device, wherein the link includes at least one lane implemented over at least one of the ports, and the PCIe controller includes a link training and status state machine (LTSSM) configured to perform a first lane number negotiation according to a first ordering of the ports and a second lane number negotiation according to a second ordering of the ports different from the first ordering of the ports, and determine an optimized link width for the link according to the results of the first lane number negotiation and the second lane number negotiation.

According to another embodiment of the inventive concept, there is provided a PCIe capable semiconductor device including; a plurality of N ports respectively configured to transmit and receive data in a PCIe environment, 'N' being a positive integer greater than two, and a PCIe controller configured to set a link between the PCIe capable semiconductor device and another PCIe capable semiconductor device, wherein the link includes 'M' lanes respectively established using one of the N ports, 'M' being a positive integer not greater than N, wherein the PCIe controller includes a link training and status state machine (LTSSM) configured to perform a first lane number negotiation according to a first ordering of the ports to generate a first lane number and compare the first lane number to a reference value of M/2, and if the first lane number is not less than the reference number, determine that an optimized link width for the link corresponds to the first lane number, else if the first lane number is less than the reference number, perform a second lane number negotiation according to a second ordering of the ports to generate a second lane number, and determine that the optimized link width for the link corresponds to the second lane number.

According to another embodiment of the inventive concept, there is provided a PCIe system comprising a first PCIe capable semiconductor device ("first device") and a second PCIe capable semiconductor device ("second device"), wherein the first device establishes a link including lanes respectively configured to transmit and receive data via a port among a plurality of ports ("ports") connecting the first and second devices in a PCIe environment, and the first device is configured to perform a first lane number negotiation according to a first ordering of the ports and a second lane number negotiation according to a second ordering of the ports different from the first ordering of the ports, and determine an optimized link width for the link according to the results of the first lane number negotiation and the second lane number negotiation.

According to another embodiment of the inventive concept, there is provided a PCIe system comprising a first PCIe capable semiconductor device ("first device") and a second PCIe capable semiconductor device ("second device"), wherein the first device establishes a link including M lanes respectively configured to transmit and receive data via a port among N ports connecting the first and second devices in a PCIe environment, 'N' being a positive integer greater than two and 'M' being a positive integer not greater than N, and the first device performs a first lane number negotiation according to a first ordering of the ports to generate a first lane number and compare the first lane number to a reference value of M/2, and if the first lane number is not less than the reference number, determines that an optimized link width for the link corresponds to the first lane number, else if the first lane number is less than the reference number, performs a second lane number negotiation according to a second ordering of the ports to generate a second lane number, and determines that the optimized link width for the link corresponds to the second lane number.

According to another embodiment of the inventive concept, there is provided a method of operating a PCIe system comprising a first PCIe capable semiconductor device ("first device") and a second PCIe capable semiconductor device ("second device"). The method includes; using the first device to set a link between the first device and the second device, wherein the link includes lanes, each lane being respectively connected a port of the first device and a corresponding port of the second device. The setting of the link includes; performing at least one of a first lane negotiation with respect to ports connecting the first device and second device according to a first ordering of the ports, and a second lane number negotiation with respect to the ports connecting the first device and second device according to a second ordering of the ports different from the first ordering of the ports, determining an optimized link width for the link according to the results of the first lane number negotiation and the second lane number negotiation.

According to another embodiment of the inventive concept, there is provided a method of operating a PCIe capable semiconductor device, wherein the PCIe capable semiconductor device includes; a plurality of N ports respectively configured to transmit and receive data in a PCIe environment, 'N' being a positive integer greater than two, and a PCIe controller configured to set a link between the PCIe capable semiconductor device and another PCIe capable semiconductor device, wherein the link includes 'M' lanes respectively established using one of the N ports, 'M' being a positive integer not greater than N. The method includes; performing a first lane number negotiation according to a first ordering of the ports to generate a first lane number and compare the first lane number to a reference value of M/2, and if the first lane number is not less than the reference number, determine that an optimized link width for the link corresponds to the first lane number, else if the first lane number is less than the reference number, perform a second lane number negotiation according to a second ordering of the ports to generate a second lane number, and determine that the optimized link width for the link corresponds to the second lane number.

DETAILED DESCRIPTION

Hereinafter, certain embodiments of the inventive concept will be described with reference to the foregoing drawings. However, it should be noted that the scope of the inventive concept is not limited to only the illustrated embodiments.

Figure 1:
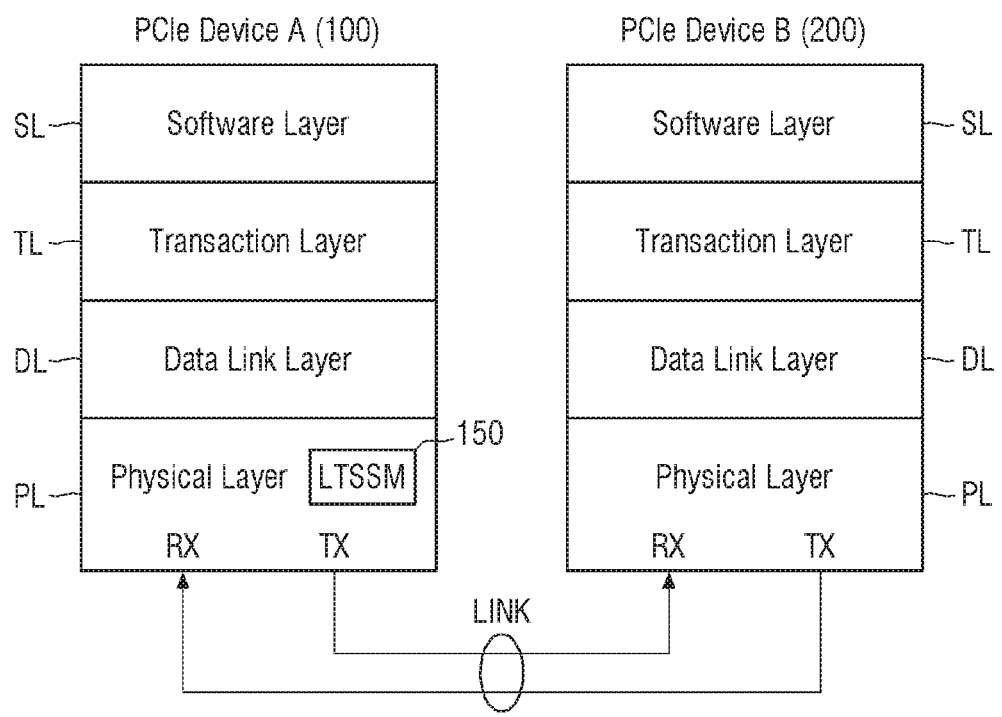
FIG. 1 is a conceptual diagram describing a semiconductor system according to an embodiment of the inventive concept.

FIG. 1 is a conceptual diagram describing a semiconductor system according to an embodiment of the inventive concept.

Referring to FIG. 1, the semiconductor system generally includes a first PCIe device 100 and a second PCIe device 200. The first PCIe device 100 and the second PCIe device 200 are configured to transmit and receive data using a PCIe interface protocol. As will be appreciated from a review of the pertinent technical specifications, a PCIe architecture may be understood as including a number of "layers" including a physical layer (PL), a data link layer (DL), a transaction layer (TL), and a software layer (SL).

The PL corresponds to a lowermost layer, and serially transmits data packets generated by the DL between the PCIe devices. Referring to FIG. 1, the PL provides a link formed through the transmitting (TX) and the receiving (RX) between the PCIe devices 100 and 200. Data packets having a defined format are exchanged between the PCIe devices 100 and 200 via a defined link (LINK).

The DL corresponds to a layer disposed on (or functionally enabled by) the PL, and provides certain functions that ensure the reliability of packet transmissions via the link, as well as related functions that manage the link. For example, the DL may be used to add sequence number(s), cyclic redundancy check (CRC) information, and/or the like to the packets generated by the TL.

The TL receives data and/or transmits data and related requests and/or acknowledgements defined according to the SL. Thus, the TL may be used to generate a request packet, and transfer the request packet to the DL. Further, TL may be used to receive a response packet from the DL, and match the received response packet to a data read or a write request received from SL.

The SL corresponds to an uppermost layer not explicitly defined by the PCIe technical specification, may include a software for driving the PCIe device, for receiving a data read or write request from a user or host application, and for providing a response to the data read or write request to the user or host application.

More specific information regarding the physical layer (PL), the data link layer DL, the transaction layer (TL), and the software layer (SL) may be obtained by recourse to the PCIe technical specification.

Referring again to FIG. 1, the PL of the first PCIe device 100 is assumed to include a link training and status state machine (LTSSM) 150. Although not shown in FIG. 1, the second PCIe device 200 may also include a LTSSM. In this regard, those of ordinary skill in the art will understand that exemplary LTSSM may be understood from a review of the PCIe technical specification. For example, in certain embodiments of the inventive concept, the LTSSM 150 may be configured within (or using the resources of) a PCIe controller provided by one or both of the connected PCIe devices, but the scope of the inventive concept is not limited thereto.

In this regard, certain embodiments of the inventive concept will use a PCIe controller that is configured to operate in relation to a root complex. Here again, a more detailed description of the root complex is provided in the PCIe technical specification.

In the description of illustrated embodiments that follows, it is assumed that a root complex is used to control the operation of the LTSSM 150 of the first PCIe device 100. Thus, the LTSSM 150 of the first PCIe device 100 may include eleven (11) states of detection, polling, configuration, recovery, L0, L0s, L1, L2, hot reset, loopback, and disable. And the LTSSM 150 may be used to perform various tasks associated with the transmitting of data according to the PCIe interface protocol while operating in any one of the eleven states. Definitions associated with the eleven states are provided in the PCIe technical specification, and the LTSSM 150 is generally implemented to follow the definition of LTSSM described in the PCIe technical specification.

Accordingly, the LTSSM 150 of the first PCIe device 100 executes (or performs) an initialization routine for setting a link between the PCIe devices 100 and 200 used to transmit and receive data. As described above, the transmitting paths and receiving paths between PCIe devices are defined as a link. A link includes at least one pair of transmitting and receiving paths. Transmitting and receiving paths constituting one pair define a lane, and a number of lanes constituting one link is referred to as a link width.

The LTSSM 150 of the first PCIe device 100 performs a link number negotiation and a lane number negotiation in order to set the link with the second PCIe device. During these negotiations, the LTSSM 150 also determines whether lanes normally operate, selects the lanes used for data transmission to establish a link, and determines a link width.

In order to perform the link number and lane number negotiations, the LTSSM 150 of the first PCIe device 100 sends signals to the second PCIe device 200, and receives signals from the second PCIe device 200 using a TS1 ordered set. Specific information regarding the TS1 ordered set is defined in the PCIe technical specification.

It should be noted here that PCIe technology, unlike previous PCI technologies, employs a serial transmission interface. Therefore, PCIe technical specification defines a high-speed serial input/output (I/O) interface. Accordingly, it will be appreciated that various examples described in the PCIe technical specification may be implemented in the so-called "PCIe environment", as well as in the more generic "high-speed serial I/O environment".

Hereinafter, one approach to the execution of an initialization routine enabling the LTSSM 150 of the PCIe device 100 to set a link will be described with reference to FIGS. 2 through 5.

FIGS. 2 through 5 are respective block diagrams illustrating one possible initialization routine for setting a link between PCIe devices according to an embodiment of the inventive concept.

Figure 2:
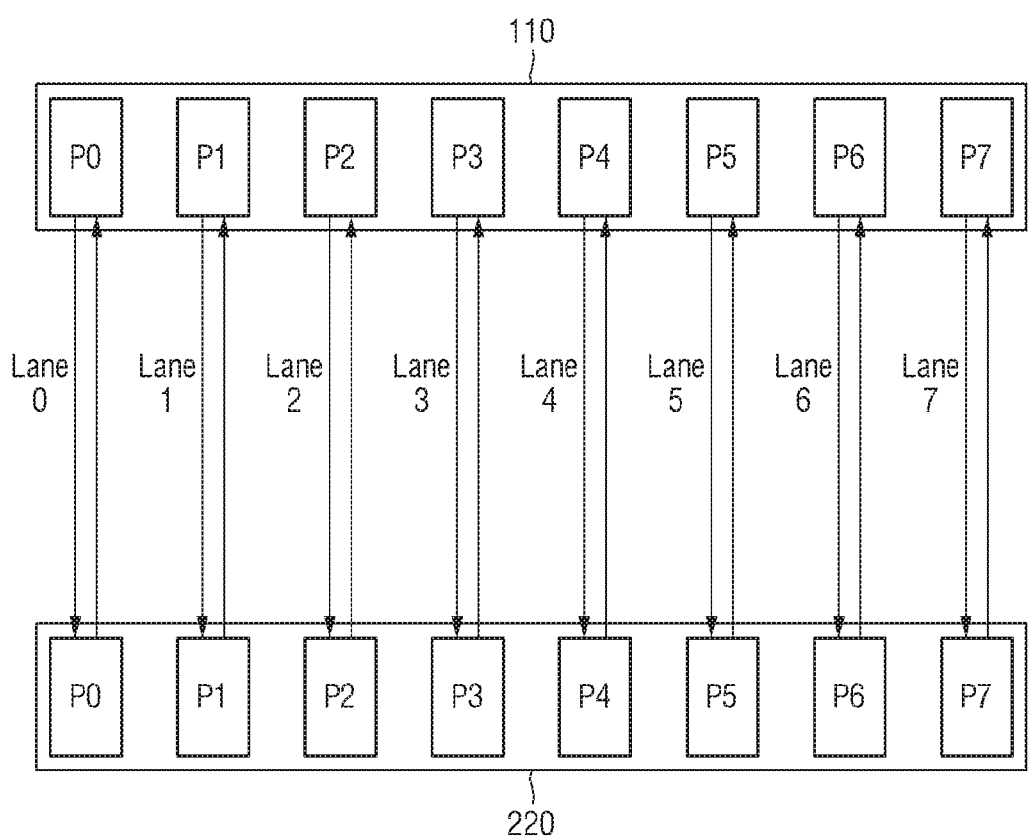
FIGS. 2 through 5, inclusive, are respective block diagrams illustrating an approach to the setting of a link between PCIe devices according to embodiments of the inventive concept.

Referring to FIG. 2, the first PCIe device 100 includes a first PCIe interface connector 110, and the second PCIe device 200 includes a second PCIe interface connector 220. These PCIe interface connectors 110 and 220 are implemented according to standards defined in the PCIe technical specification for the purpose of data transmission in accordance with the PCIe interface protocol.

The first PCIe interface connector 110 includes a plurality of ports P0 to P7, and the second PCIe interface connector 220 also includes a plurality of ports P0 to P7.

In this embodiment, for convenience of explanation, it is shown that each of the first PCIe interface connector 110 and the second PCIe device 200 includes eight ports. However, it is obvious that the number of ports included in each of the connectors is not limited thereto.

The PCIe interface protocol employs a dual-simplex connection model including simplex transmitting paths and simplex receiving paths. These transmitting paths and receiving paths form a link. Among these, a pair of a transmitting path and a receiving path forms a lane.

For example, the transmitting path and receiving path between the port P0 of the first PCIe interface connector 110 and the port of P0 of the second PCIe interface connector 220 may form Lane 0, and the transmitting path and receiving path between the port P2 of the first PCIe interface connector 110 and the port of P2 of the second PCIe interface connector 220 may form Lane 2, etc.

The lane formation procedure may be executed according to the link number negotiation and lane number negotiation performed by the LTSSM 150 of the first PCIe device 100, which will be described later.

Figure 3:
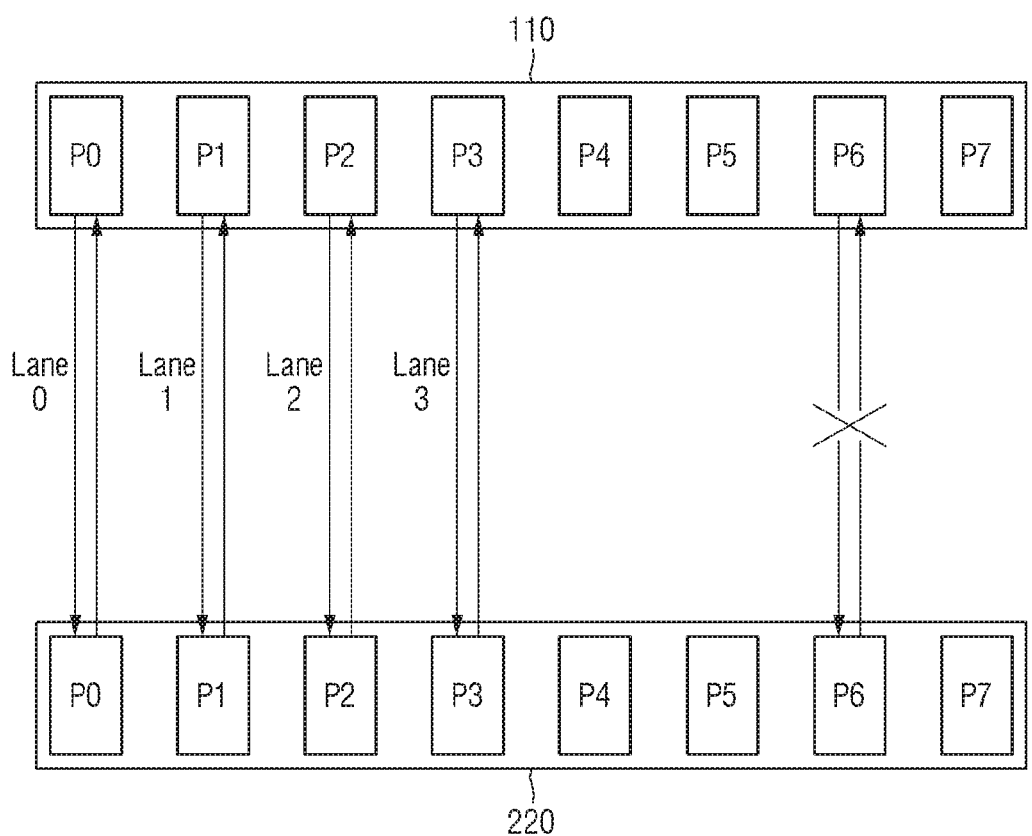

FIG. 3 shows a case where a prospective lane between the port P6 of the first PCIe interface connector 110 and the port P6 of the second PCIe interface connector 220 does not operate normally while the LTSSM 150 of the first PCIe device 100 performs link number negotiation with the second PCIe device 200. That is, in FIG. 3, Lane 6 corresponds to a failed lane.

For example, there may be a case where a problem occurs in the transmitting path through which data are transmitted from the port P6 of the first PCIe interface connector 110 to the port P6 of the second PCIe interface connector 220, or a case where a problem occurs in the receiving path through which the port P6 of the first PCIe interface connector 110 receives data from the port P6 of the second PCIe interface connector 220.

In this case, the LTSSM 150 of the first PCIe device 100 performs lane number negotiation (e.g.,) in order of sequentially increasing the port number of the plurality of ports P0 to P7 of the first PCIe interface connector 110. In other words, an ordering of the ports may be a sequential ascending or increasing from a lowest designated port (e.g., P0) to a highest designated port (e.g., P7). Alternately, an ordering of the ports may be a sequential descending or decreasing from the highest designated port (e.g., P7) to the lowest designated port (e.g., P0).

According to the PCIe technical specification, the link width corresponding to the number of lanes forming one link is generally determined to be any one of lane 1, lane 2, lane 4, lane 8, lane 12, lane 16, and lane 32. (To avoid confusion between different numberings of elements lane widths will hereafter be referred to using the nomenclature "1", "2", "4", etc.). Therefore, the LTSSM 150 of the first PCIe device 100 may set a link having a width "4" using a first port number ordering in which port numbers sequentially increases from the port number P0 of the first PCIe interface connector 110.

In the present embodiment illustrated in FIG. 3, it is therefore assumed that the order in which lanes are considered for lane width definition with respect to a given set of ports is a sequentially increasing one (i.e., a sequentially ascending port number ordering). However, the scope of the inventive concept is not limited thereto. Thus, according to another approach, lanes may be considered according to sequentially decreasing port number (i.e., a sequentially descending port number ordering).

However, continuing with the illustrated example of FIG. 3, the first PCIe device 100 and the second PCIe device 200 are resultantly configured to operate according to a link width of "4" according to the PCIe interface protocol.

Figure 4:
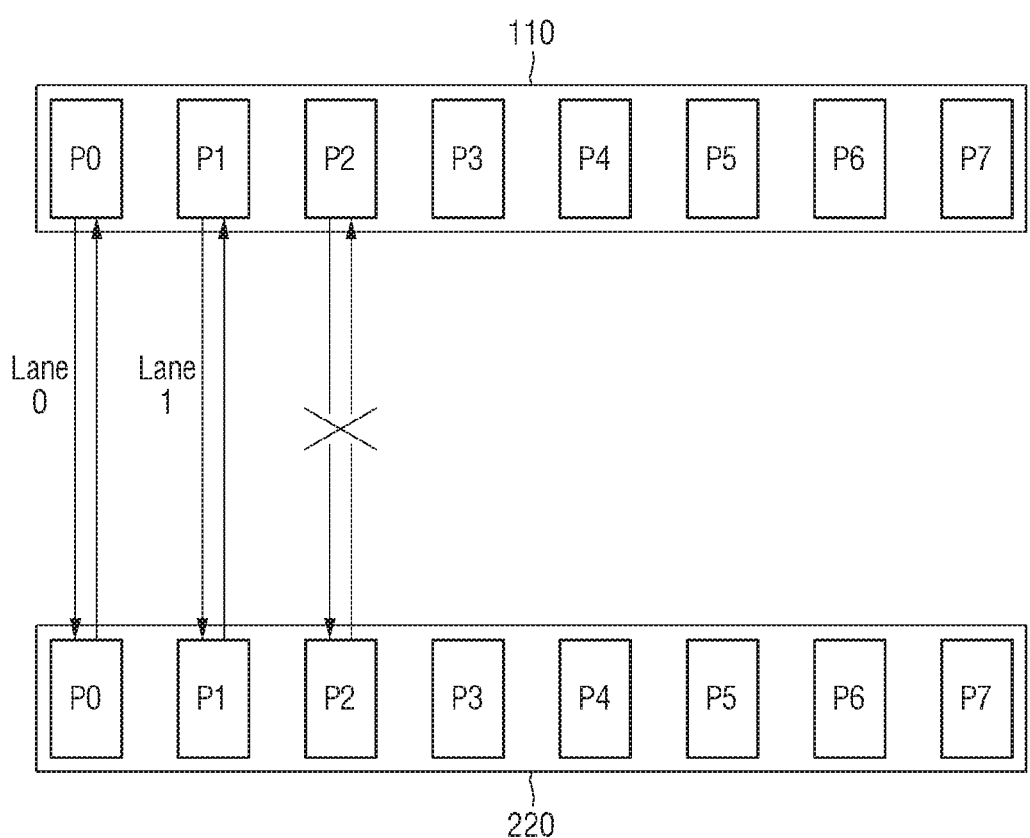
Figure 5:
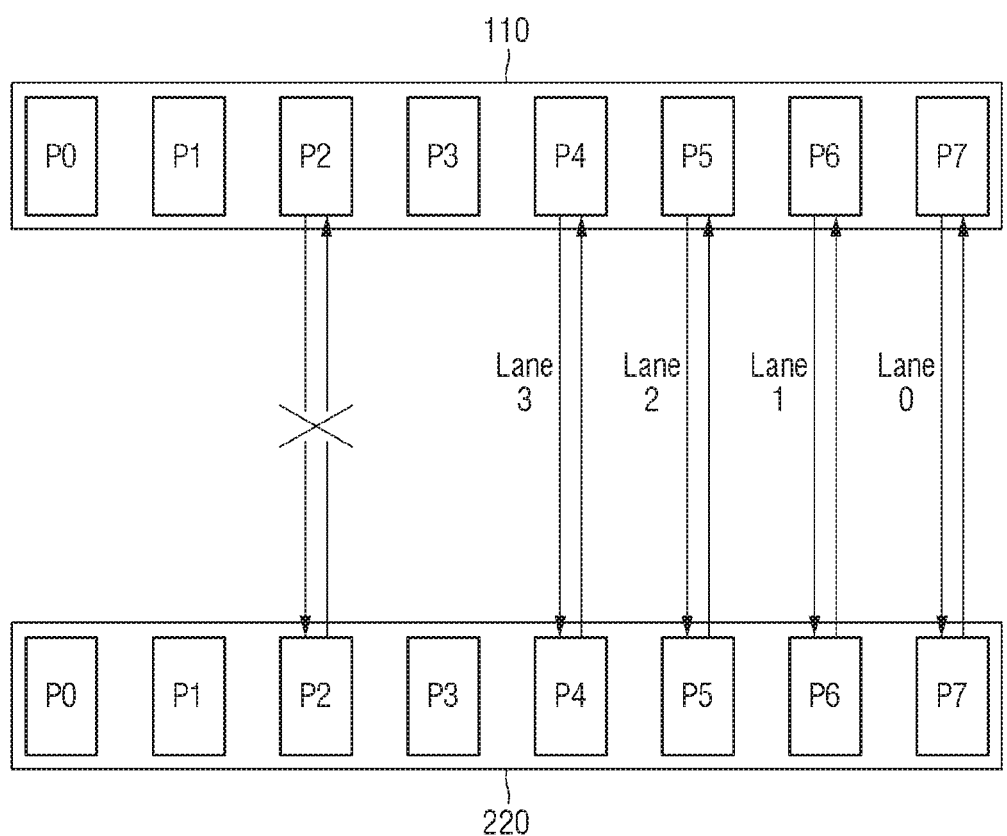

FIGS. 4 and 5 respectively illustrate cases in which a lane between the port P2 of the first PCIe interface connector 110 and the port P2 of the second PCIe interface connector 220 does not operate normally while the LTSSM 150 of the first PCIe device 100 performs link number negotiation with the second PCIe device 200. That is, in FIGS. 4 and 5, Lane 2 corresponds to a failed lane.

For example, there may be a case where a problem occurs in the transmitting path through which data are transmitted from the port P2 of the first PCIe interface connector 110 to the port P2 of the second PCIe interface connector 220, or a case where a problem occurs in the receiving path through which the port P2 of the first PCIe interface connector 110 receives data from the port P2 of the second PCIe interface connector 220.

Referring to FIG. 4, in this case, the LTSSM 150 of the first PCIe device 100 performs lane number negotiation according to a sequentially ascending ordering of port numbers for ports P0 to P7 of the first PCIe interface connector 110. As a result of performing the lane number negotiation in sequentially ascending order, the LTSSM 150 of the first PCIe device 100 sets a link having a width of "2".

However, the number of lanes forming a link is only "2", whereas the number of lanes not forming the link, yet not corresponding to fail lanes is five. Even if considering the link width which can be formed according to the PCIe technical specification, the LTSSM 150 of the first PCIe device 100 does not use four lanes corresponding to port numbers P4 to P7, and uses only two lanes having a smaller bandwidth than that of each of the four lanes corresponding to port numbers P0 and P1, in order to set the link. Depending on viewpoint, it may be considered that four lanes capable of providing a wider bandwidth have been wasted.

Referring to FIG. 5, in order to better address the problem illustrated in FIG. 4, the LTSSM 150 of the first PCIe device 100 may alternately or additionally perform lane number negotiation in a sequentially descending order with respect to the ports P0 to P7 of the first PCIe interface connector 110.

Extending the illustrated examples, a "first ordering approach" is implemented with respect to the ports P0 to P7 using a sequentially ascending set of port numbers, whereas a "second ordering approach" is implemented with respect to the same ports P0 to P7 using a sequentially descending set of port numbers. Hence, different ordering approaches (e.g., even/odd; ascending/descending; etc.) may be implemented with respect to a particular number and arrangement of ports in order to identify a maximized link width, and all this may be accomplished during one or more lane number negotiation(s) executed between connected PCIe devices in a PCIe system. Again referencing the foregoing examples of FIGS. 4 and 5, a "first lane number negotiation" results in a lane width of "2" while a "second lane number negotiation" results in a lane width of "4". And since a link having a width of "2" is significantly less robust than a link having a width of "4", the link definition between the PCIe devices 100 and 200 should use ports P4 and P7, as identified by the second lane number negotiation. Accordingly, the LTSSM 150 of the first PCIe device 100 may finally set the link having a width of "4".

In this manner when failed lanes exist in relation to the definition (or setting) of a link between PCIe devices, the link width between the PCIe devices may nonetheless be maximized.

Here it should be noted with respect to the embodiments illustrated in FIG. 5, that the LTSSM 150 of the first PCIe device 100 forms lane 0 between the port 7 of the first PCIe interface connector 110 and the port 7 of the second PCIe interface connector 220, and forms lane 1 between the port 6 of the first PCIe interface connector 110 and the port 6 of the second PCIe interface connector 220. That is, in the embodiment of FIG. 5, since the LTSSM 150 of the first PCIe device 100 sets a lane, the LTSSM 150 must support a PCIe lane reversal function, as defined by the PCIe technical specification. The LTSSM 150 may set lane numbers in a reverse order using the PCIe lane reversal function for the purpose of executing the second lane number negotiation described above.

In the aforementioned embodiments, the LTSSM 150 of the first PCIe device 100 may perform lane number negotiation according to a first order, then perform lane number negotiation according to a second order, and then determine an optimized (or lane width maximized) link according to the first and second lane number negotiation results.

Accordingly, if the LTSSM 150 of the first PCIe device 100 is able to predict a failed lane in advance, an optimized link having a maximized link width may be obtained using only a single lane number negotiation.

According to the PCIe technical specification, the LTSSM 150 of the first PCIe device is able to perform an internal link number negotiation before performing the lane number negotiation with the second PCIe device 200. During this procedure, a determination may be made as to whether (and which) lane may be expected to fail in relation to a given set of ports.

That is, the LTSSM 150 of the first PCIe device 100 may perform an internal link number negotiation with respect to the ports P0 to P7 in order to detect failed lane number(s), and may therefore perform only a single, external lane number negotiation in view of the prior determination of failed lane number(s).

For example, extending the examples previously described in relation to FIGS. 4 and 5, the LTSSM 150 of the first PCIe device 100 may perform only the first or second lane number negotiation with respect to the second PCIe device 200 after determining whether a detected failed lane port number is less than a predetermined value. Here, the predetermined value may be a value obtained by dividing the total number of lanes by two (i.e., a predetermined value of four for the illustrated embodiments of FIGS. 4 and 5). Accordingly, the LTSSM 150 of the first PCIe device 100 may perform the second lane number negotiation after the first lane number negotiation when the port number of the failed lane is less than 4, and may not perform the second lane number negotiation after the first lane number negotiation when the port number of the failed lane is equal to or more than 4.

Hereinafter, example(s) of performing an initialization procedure whereby the LTSSM 150 of the first PCIe device 100 may set an optimized link will be described in some additional detail with reference to FIGS. 6 through 14.

FIGS. 6, 7, 8 and 9 are respective block diagrams illustrating various examples of an initialization procedure for setting a link between PCIe devices according to embodiments of the inventive concept.

For the convenience of description, the illustrated examples of FIGS. 6, 7, 8 and 9 assume PCIe devices 100 and 200 respectively including four ports (Ports 0, 1, 2 and 3), wherein Port 2 is associated with a failed lane (i.e., Lane 2 is a failed lane).

Figure 6:
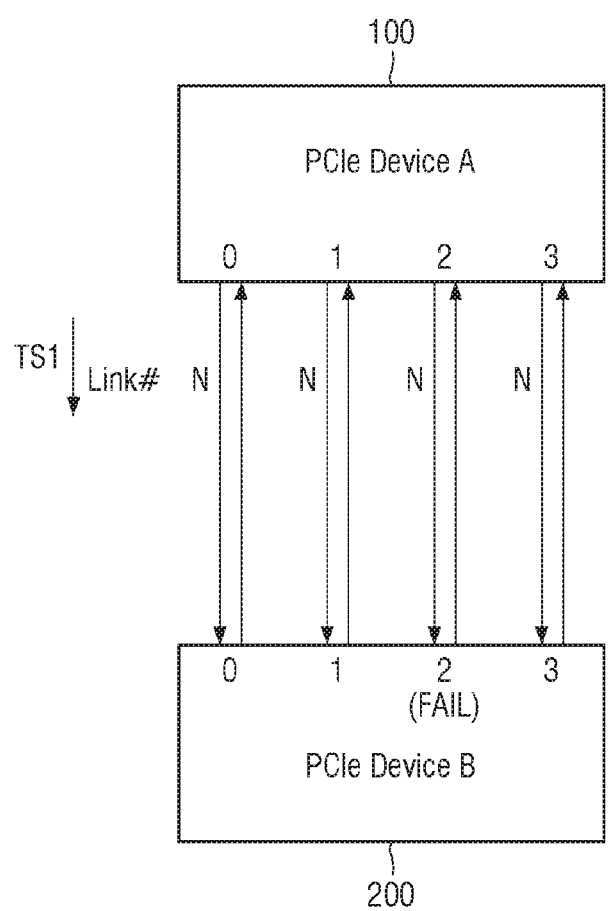
FIGS. 6 through 9, inclusive, are respective block diagrams illustrating another approach to the setting of a link between PCIe devices according to embodiments of the inventive concept.

Referring to FIG. 6, the LTSSM 150 of the first PCIe device 100 performs a first link number negotiation, such that the LTSSM 150 communicates a resulting link number 'N' to the second PCIe device 200 via one of Ports 0, 1, 2 and 3. For example, the link number may be recorded in a TS1 ordered set and transmitted to the second PCIe device 200.

Figure 7:
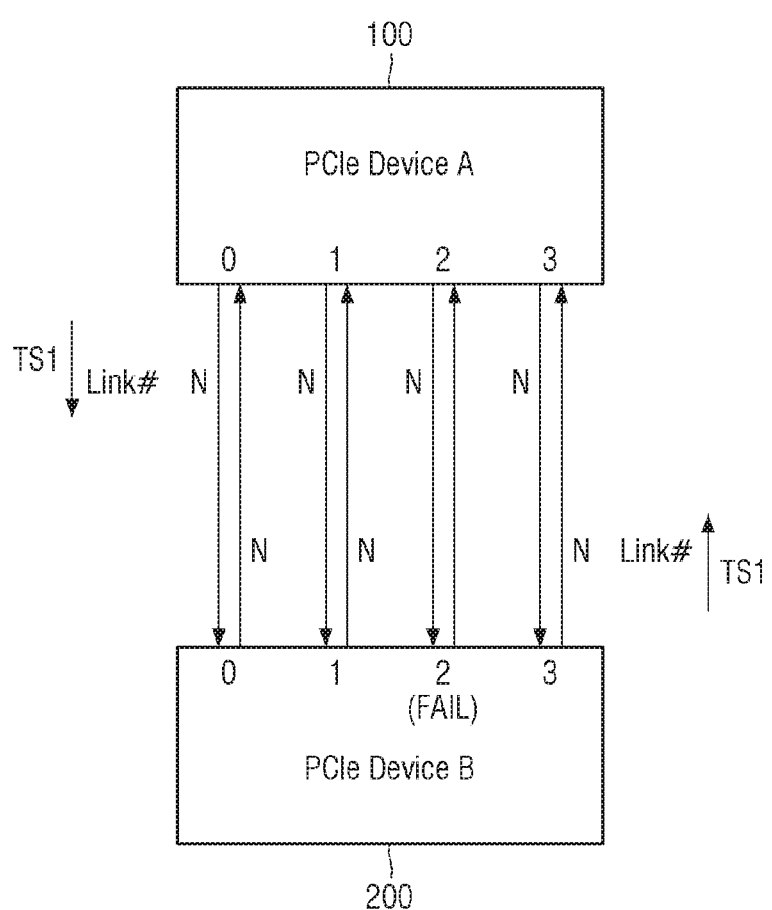

Referring to FIG. 7, the second PCIe device 200 may then communicate (or return) the same link number N to the first PCIe device 100 via each of the Ports 0, 1, 2 and 3. Here again, the returned link number may be recorded in a TS1 ordered set and transmitted to the first PCIe device 100.

Here, however, under the working assumptions of the illustrated example, Lane 2 is a failed lane, and therefore, the second PCIe device 200 will not be able to transmit the returned link number to Port 2 of the first PCIe device 100. Depending on the implementation manner, the second PCIe device 200 may transmit a PAD symbol corresponding to a packet filler with respect to Port 2, but the scope of the inventive concept is not limited thereto.

Due to the response to the second PCIe device 200, the LTSSM 150 of the first PCIe device 100 may recognize Lane 0 and Lane 1 may be used to establish a link.

Figure 8:
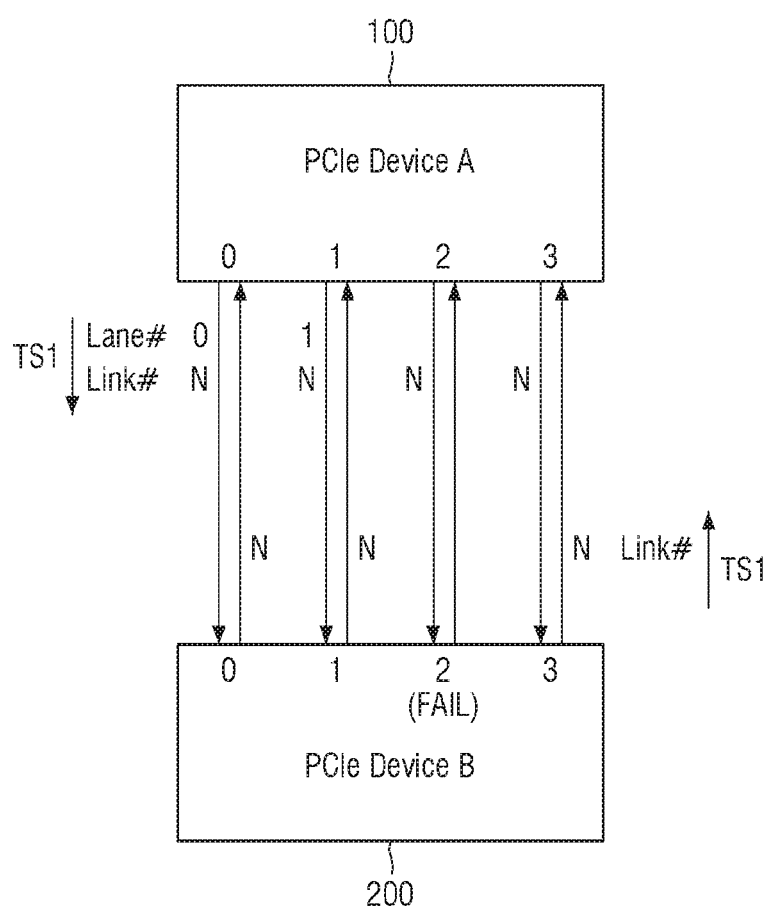

Next, referring to FIG. 8, the LTSSM 150 of the first PCIe device 100 may perform a second lane number negotiation.

The LTSSM 150 of the first PCIe device 100 transmits lane number to the second PCIe device 200 each of the ports 0 and 1. Specifically, lane number 0 is given to the port 0, and lane number 1 is given to the port 1. The lane number may be recorded in the TS1 ordered set and transmitted to the second PCIe device 200. In contrast, lane number is not given to the ports 2 and 3.

The reason for this is that the LTSSM 150 of the first PCIe device 100 selects a link having a wider width, excluding lane 2, because lane 2 is a failed lane.

As the specific method of allowing the LTSSM 150 of the first PCIe device 100 to select a link having a greatest width, the aforementioned various methods may be used.

That is, the LTSSM 150 of the first PCIe device 100 selects a link having a wider width of links each having a width of 2 corresponding to ports 0 and 1 and a link having a width of 1 corresponding to port 3, and then transmits lane number to the second PCIe device 200 through only the ports 0 and 1.

Figure 9:
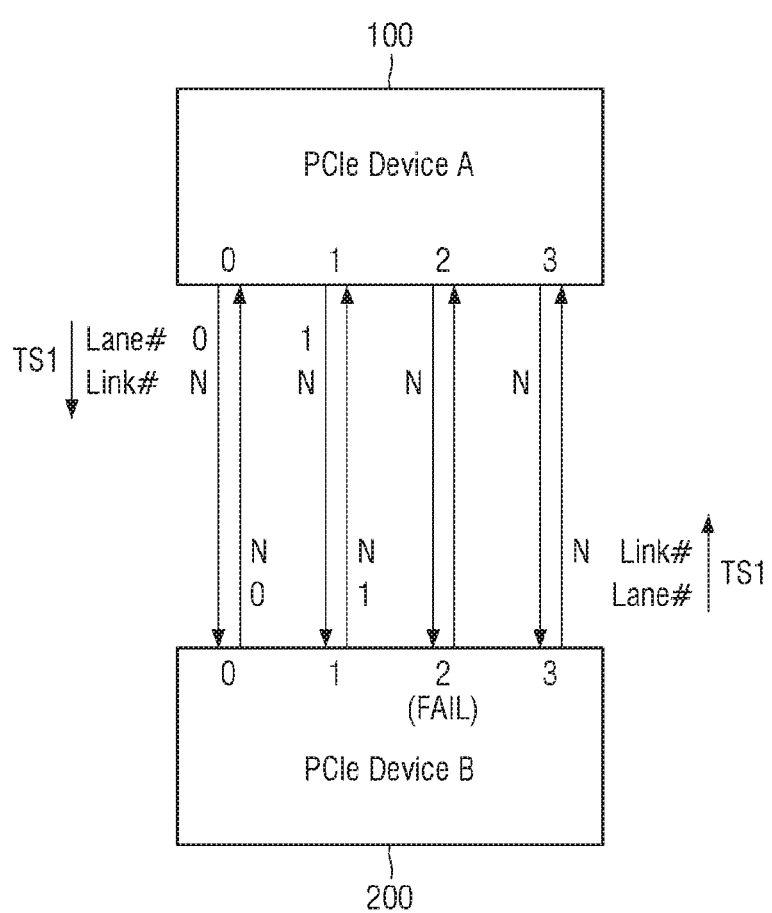

Referring to FIG. 9, the second PCIe device 200 transmits the same lane numbers 0 and 1 as the link number received from the first PCIe device 100 to the first PCIe device 100 through each of the ports 0 and 1. The link number may be recorded in the TS1 ordered set and transmitted to the first PCIe device 100.

Due to the response to the second PCIe device 200, the LTSSM 150 of the first PCIe device 100 may recognize that the negotiation is finished and the link is established, may be transited to a L0 state, and may start data transmission.

FIGS. 10, 11, 12, 13 and 14 are respective block diagrams illustrating examples of setting a link between PCIe devices according to embodiments of the inventive concept.

For the convenience of description, it is assumed that for each illustrated example shown in FIGS. 10 through 14, each of the PCIe devices 100 and 200 includes four ports (Lanes 0, 1, 2 and 3), wherein Lane 1 is a failed lane.

Figure 10:
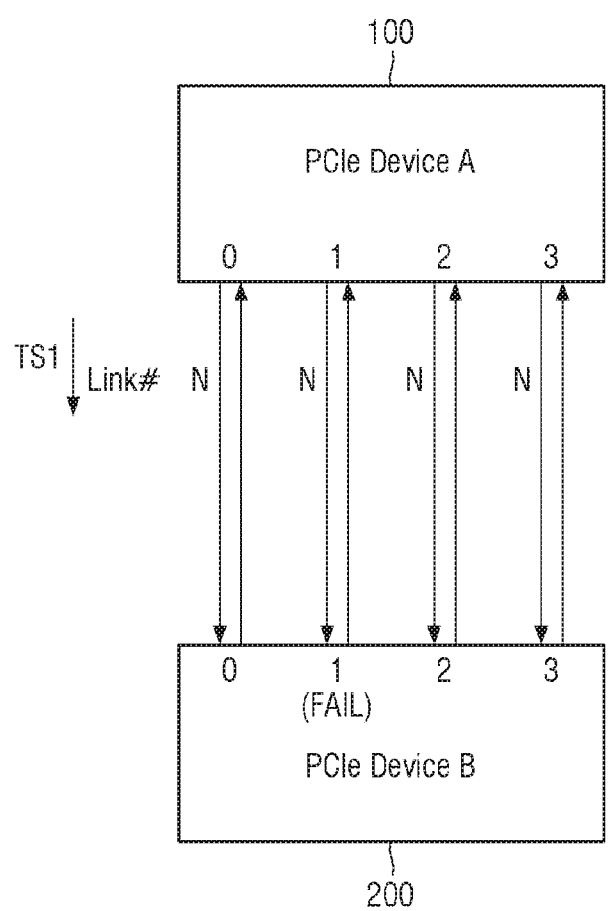
FIGS. 10 through 14, inclusive, are respective block diagrams illustrating still another approach to the setting of a link between PCIe devices according to embodiments of the inventive concept.

Referring to FIG. 10, the LTSSM 150 of the first PCIe device 100 performs a first link number negotiation.

Here, the LTSSM 150 transmits any link number N to the second PCIe device 200 via each of the Ports 0 to 3. The link number may be recorded in a TS1 ordered set and transmitted to the second PCIe device 200.

Figure 11:
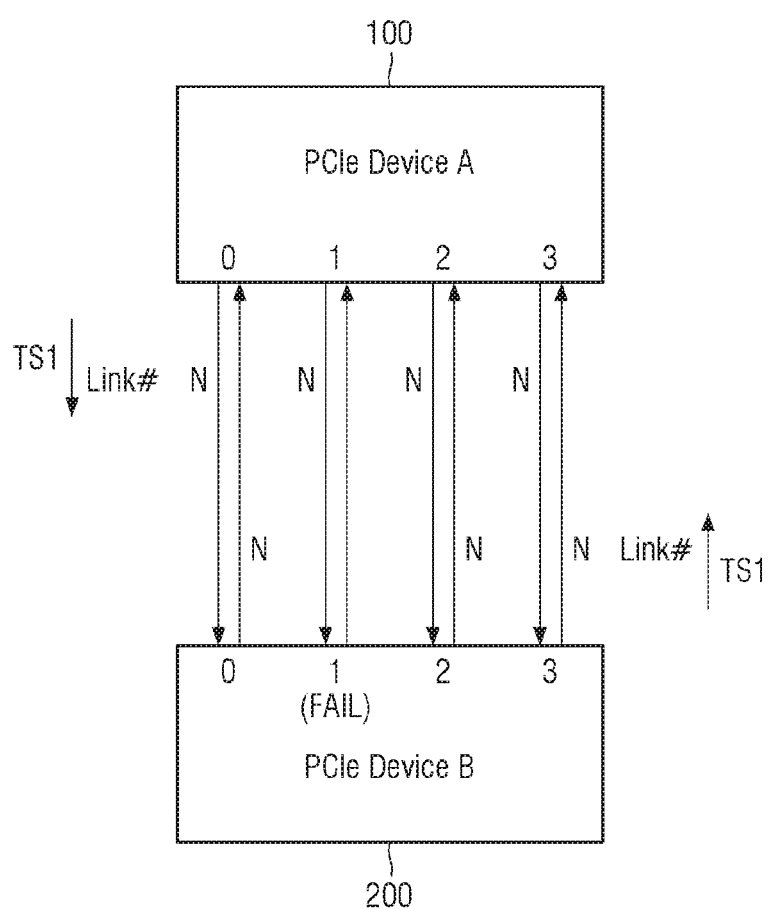

Referring to FIG. 11, the second PCIe device 200 transmits the same link number N as the link number received from the first PCIe device 100 to the first PCIe device 100 through each of the Ports 0 to 3. The link number may be recorded in the TS1 ordered set and transmitted to the first PCIe device 100.

However, here, since lane 1 is a failed lane, the second PCIe device 200 does not transmit the same link number N as the link number received from the first PCIe device 100 to the first PCIe device 100 through the Port 1. Depending on the implementation manner, the second PCIe device 200 may transmit a PAD symbol corresponding to a packet filler with respect to the Port 1, but the scope of the inventive concept is not limited thereto.

Due to the response to the second PCIe device 200, the LTSSM 150 of the first PCIe device 100 may recognize Lane 0, Lane 2, and Lane 3, which can be used to establish a line.

Figure 12:
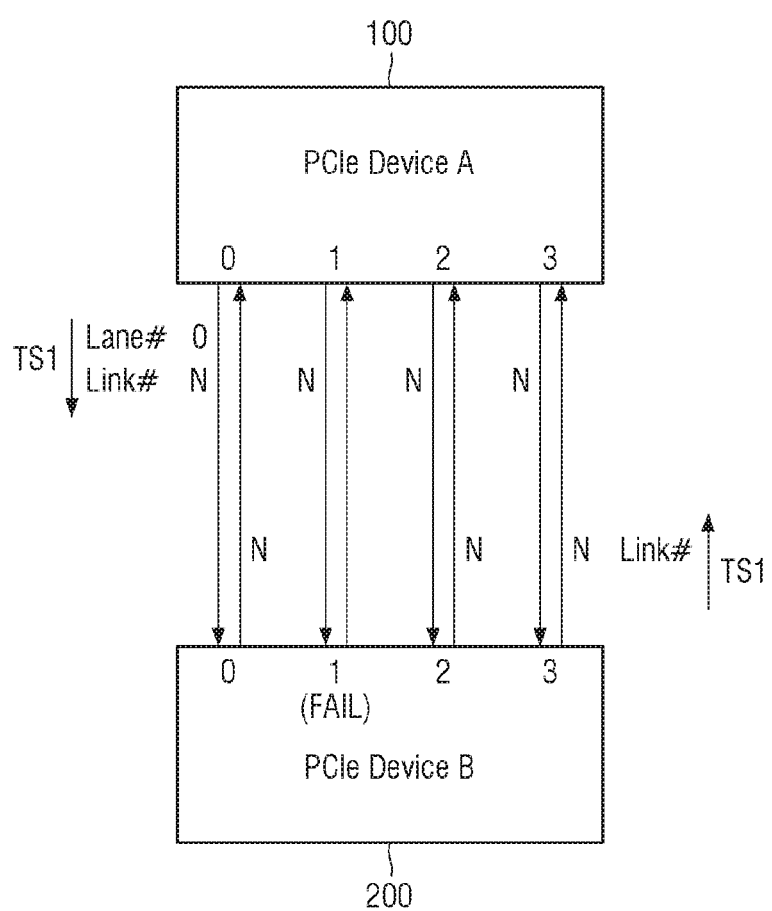

Next, referring to FIG. 12, the LTSSM 150 of the first PCIe device 100 performs a second lane number negotiation.

That is, the LTSSM 150 of the first PCIe device 100 transmits lane number to the second PCIe device 200 through the Port 0. Specifically, lane number 0 is given to the port 0. The lane number may be recorded in the TS1 ordered set and transmitted to the second PCIe device 200. In contrast, lane number is not given to each of the ports 1, 2 and 3.

Figure 13:
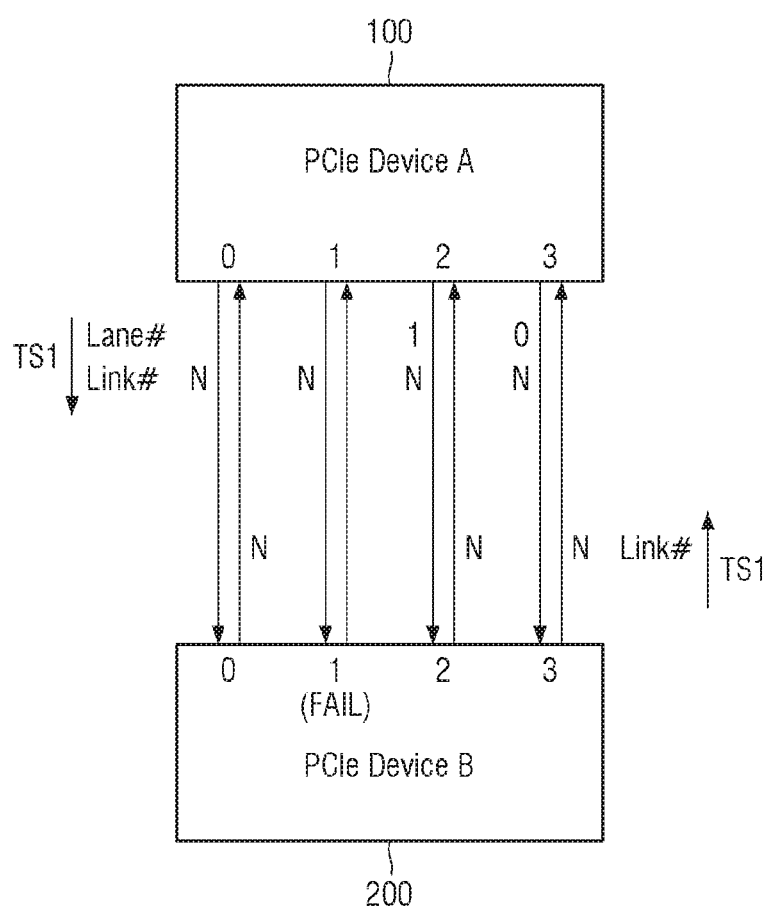

Next, referring to FIG. 13, the LTSSM 150 of the first PCIe device 100 performs second lane number negotiation by transmitting lane number to the second PCIe device 200 through each of the Ports 2 and 3. The LTSSM 150 may set the lane number in a reverse order using a PCIe lane reversal function for the purpose of the second lane number negotiation.

That is, the LTSSM 150 of the first PCIe device 100 transmits lane number to the second PCIe device 200 through each of the Ports 2 and 3. Specifically, lane number 1 is given to the Port 0, and lane number 0 is given to the Port 3. The lane number may be recorded in the TS1 ordered set and transmitted to the second PCIe device 200. In contrast, lane number is not given to each of the Ports 0 and 2.

The LTSSM 150 of the first PCIe device 100 may select a link having a wider width as the results of first lane number negotiation and second lane number negotiation. However, the specific method of allowing the LTSSM 150 of the first PCIe device 100 to select a link having a wider width is not limited thereto, and the aforementioned various methods related to FIG. 5 may be used.

That is, the LTSSM 150 of the first PCIe device 100 selects a link having a wider width of a link having a width of 1 corresponding to Port 0 and links each having a width of 2 corresponding to Ports 2 and 3, and then transmits lane number to the second PCIe device 200 through only the Ports 2 and 3.

Figure 14:
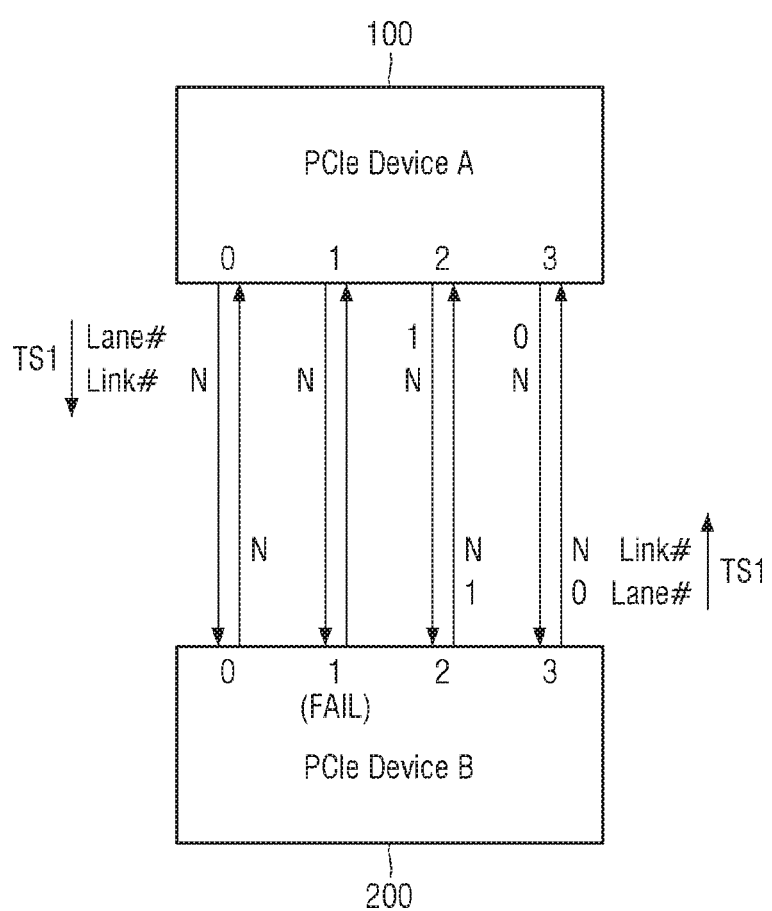

Referring to FIG. 14, the second PCIe device 200 transmits the same lane numbers 0 and 1 as the link number received from the first PCIe device 100 to the first PCIe device 100 through each of the Ports 2 and 2. The link number may be recorded in the TS1 ordered set and transmitted to the first PCIe device 100.

Due to the response to the second PCIe device 200, the LTSSM 150 of the first PCIe device 100 may recognize that the negotiation is finished and the link is established, may be transited to a L0 state, and may start data transmission.

Figure 15:
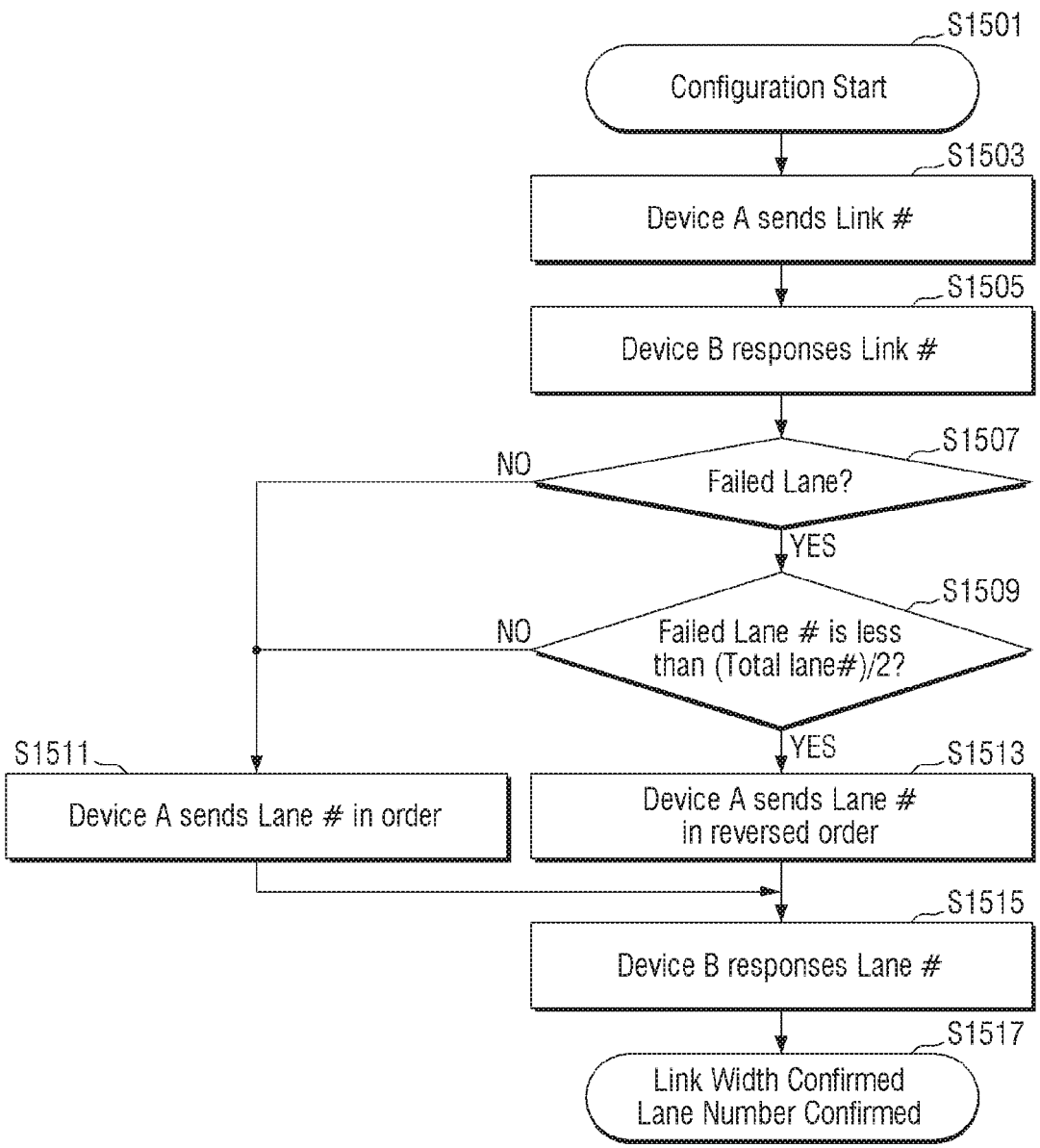
FIG. 15 is a flowchart summarizing, as one example, a method of operating a semiconductor device according to embodiments of the inventive concept.

FIG. 15 is a flowchart summarizing in one example a method of operating a semiconductor device according to an embodiment of the inventive concept.

Referring to FIG. 15, link setting starts (S1501), and the first PCIe device 100 transmits a link number to the second PCIe device 200 in order to perform a first link number negotiation (S1503).

In response to this, the second PCIe device 200 transmits a returned link number to the first PCIe device 100 (S1505).

The first PCIe device 100 determines whether a failed lane exists based on the response received from the second PCIe device 200 (S1507). If a failed lane exists, the first PCIe device 100 determines whether the lane number of the failed lane is less than a predetermined value, for example, a value obtained by dividing the total number of lanes by half (S1509).

If the failed lane does not exist or if the lane number of the failed lane is equal to or more than the predetermined value although the failed lane exists, the first PCIe device 100 gives lane numbers in a first order for the purpose of lane number negotiation, and transmit these lane numbers to the second PCIe device 200 (S1511).

If the lane number of the failed lane is less than the predetermined value, the first PCIe device 100 gives lane numbers in a second (e.g., a reversed) order for the purpose of executing a second lane number negotiation, and transmit these lane numbers to the second PCIe device 200 (S1513).

In response to this, the second PCIe device 200 transmits the lane number to the first PCIe device 100 (S1515).

Due to the response to the second PCIe device 200, the first PCIe device 100 may recognize that the negotiation is finished and the link is established, may be transited to a L0 state, and may start data transmission (S1517).

According to various embodiments of the inventive concept, during an initialization procedure for setting a link between PCIe devices, if a fail lane exists, an optimized link width between the PCIe devices may nonetheless be determined.

Although the preferred embodiments of the inventive concept have been disclosed for illustrative purposes, those skilled in the art will appreciate that various modifications, additions and substitutions are possible, without departing from the scope of the inventive concept as disclosed in the accompanying claims.

What is claimed is:

1. A PCIe capable semiconductor device, comprising:
ports respectively configured to transmit and receive data in a PCIe environment; and
a PCIe controller configured to set a link between the PCIe capable semiconductor device and another PCIe capable semiconductor device,
wherein the link includes at least one lane implemented over at least one of the ports, and
the PCIe controller includes a link training and status state machine (LTSSM) configured to selectively perform a first lane number negotiation or a second lane number negotiation when there is a failed lane among the ports,
the first lane number negotiation being performed with respect to a first subset of the ports according to a first ordering of the ports in which port number sequentially increases or decreases, and the second lane number negotiation being performed with respect to a different second subset of the ports according to a second ordering of the ports opposite to the first ordering of the ports, and
the LTSSM selectively performing the first lane number negotiation or the second lane number negotiation that maximizes a link width for the link, wherein the link width is a number of lanes included within the link.

2. The PCIe capable semiconductor device of claim 1, wherein the first ordering of the ports is a sequential increasing of the ports from a lowest designated port to a highest designated port, and
the second ordering of the ports is a sequential decreasing of the ports from the highest designated port to the lowest designated port.

3. The PCIe capable semiconductor device of claim 2, wherein the first lane number negotiation results in a first link width, the second lane number negotiation results in a second link width less than the first link width, and the PCIe controller determines that the optimized line width corresponds to the first link width.

4. The PCIe capable semiconductor device of claim 2, wherein the LTSSM supports a PCIe lane reversal function enabling the first and second ordering of the ports.

5. The PCIe capable semiconductor device of claim 1, wherein each one of the first and second lane number negotiations is performed using a respective TS1 ordered set.

6. The PCIe capable semiconductor device of claim 1, wherein the PCIe controller is further configured to identify a port among the ports associated with the failed lane, and thereafter determine the optimized link width in relation to a reference value equal to a total number of ports divided by 2.

7. The PCIe semiconductor device of claim 6, wherein the second lane number is determined to be the optimized lane width when a port number for the identified port is less than the reference value.

8. A PCIe capable semiconductor device, comprising:
a plurality of N ports respectively configured to transmit and receive data in a PCIe environment, 'N' being a positive integer greater than two; and
a PCIe controller configured to set a link between the PCIe capable semiconductor device and another PCIe capable semiconductor device, wherein the link includes 'M' lanes respectively established using one of the N ports, 'M' being a positive integer not greater than N, wherein the PCIe controller includes a link training and status state machine (LTSSM) configured to selectively perform a first lane number negotiation or a second lane number negotiation that maximizes a link width for the link when there is a failed lane among the ports,
the first lane number negotiation is performed with respect to a first subset of the ports according to a first ordering of the ports in which the port number sequentially increases or decreases to generate a first lane number and compare the first lane number to a reference value of M/2, and if the first lane number is not less than the reference number, determine that a link width for the link corresponds to the first lane number, else
if the first lane number is less than the reference number, the second lane number negotiation is performed with respect to a different second subset of the ports according to a second ordering of the ports opposite to the first ordering of the ports to generate a second lane number, and determine that the link width for the link corresponds to the second lane number,
wherein the link width is a number of lanes included within the link.

9. The PCIe capable semiconductor device of claim 8, wherein the first ordering of the ports is a sequential increasing of the ports from a lowest designated port to a highest designated port, and
the second ordering of the ports is a sequential decreasing of the ports from the highest designated port to the lowest designated port.

10. The PCIe capable semiconductor device of claim 9, wherein the LTSSM supports a PCIe lane reversal function enabling the first and second ordering of the ports.

11. The PCIe capable semiconductor device of claim 8, wherein each one of the first and second lane number negotiations is performed using a respective TS1 ordered set.

12. A method of operating a PCIe system comprising a first PCIe capable semiconductor device ("first device") and a second PCIe capable semiconductor device ("second device"), the method comprising:
using the first device to set a link between the first device and the second device, wherein the link includes lanes, each lane being respectively connected a port of the first device and a corresponding port of the second device, wherein the setting of the link comprises:
performing, when there is a failed lane among the ports, a selected one of a first lane negotiation with respect to a first subset of the ports connecting the first device and second device according to a first ordering of the ports in which port number sequentially increases or decreases, and a second lane number negotiation with respect to a different second subset of the ports connecting the first device and second device according to a second ordering of the ports opposite to the first ordering of the ports; and
maximizing a link width for the link according to the selected one the first lane number negotiation and the second lane number negotiation, wherein the link width is a number of lanes included within the link.

13. The method of claim 12, wherein both the first lane negotiation generating a first lane number and the second lane negotiation generating a second lane number are performed,
the first ordering of the ports is a sequential increasing of the ports from a lowest designated port to a highest designated port,
the second ordering of the ports is a sequential decreasing of the ports from the highest designated port to the lowest designated port, and
the determining of the optimized link width comprises one of; comparing the first lane number to a reference value, comparing the second lane number to the reference value, and comparing the first lane number to the second lane number.

14. The method of claim 13, wherein only the first lane negotiation is performed when the first lane number is greater than the reference number and the optimized link width corresponds to the first lane number.

15. The PCIe capable semiconductor device of claim 1, wherein the first subset of ports have a lower port number than a port containing the failed lane, and the second subset of ports have a higher port number than the port containing the failed lane.

16. The PCIe capable semiconductor device of claim 15, wherein the PCIe capable semiconductor device and the other PCIe capable semiconductor device have a same number of ports.

17. The PCIe capable semiconductor device of claim 8, wherein the first subset of ports have a lower port number than a port containing the failed lane, and the second subset of ports have a higher port number than the port containing the failed lane.

18. The PCIe capable semiconductor device of claim 17, wherein the PCIe capable semiconductor device and the other PCIe capable semiconductor device have a same number of ports.

19. The PCIe capable semiconductor device of claim 12, wherein the first subset of ports have a lower port number than a port containing the failed lane, and the second subset of ports have a higher port number than the port containing the failed lane.

20. The PCIe capable semiconductor device of claim 19, wherein the PCIe capable semiconductor device and the other PCIe capable semiconductor device have a same number of ports.

* * * * *